US007792247B2

(12) United States Patent
Schmied et al.

(10) Patent No.: US 7,792,247 B2
(45) Date of Patent: Sep. 7, 2010

(54) SENSOR DEVICE FOR A PACKAGING MACHINE

(75) Inventors: Ralf Schmied, Freiberg (DE); Walter Bauer, Eberdingen (DE); Werner Runft, Winnenden (DE); Florian Bessler, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/908,426

(22) PCT Filed: Feb. 22, 2006

(86) PCT No.: PCT/EP2006/060164

§ 371 (c)(1),
(2), (4) Date: Sep. 12, 2007

(87) PCT Pub. No.: WO2006/106012

PCT Pub. Date: Oct. 12, 2006

(65) Prior Publication Data

US 2008/0134629 A1 Jun. 12, 2008

(30) Foreign Application Priority Data

Apr. 8, 2005 (DE) ....................... 10 2005 016 124

(51) Int. Cl.
*G01N 23/06* (2006.01)
*G01N 23/10* (2006.01)

(52) U.S. Cl. ............................. 378/54; 378/53; 378/57

(58) Field of Classification Search ............. 378/51–54, 378/57, 58, 62
See application file for complete search history.

(56) References Cited

U.S. PATENT DOCUMENTS

| | | | | |
|---|---|---|---|---|
| 3,007,048 | A | 10/1961 | Knapp et al. | |
| 3,038,606 | A * | 6/1962 | Leaver et al. | 209/576 |
| 3,456,108 | A | 7/1969 | Pichoir | |
| 3,796,873 | A * | 3/1974 | Ledgett | 378/54 |
| 3,995,164 | A * | 11/1976 | Ramsay et al. | 378/53 |
| 4,415,980 | A | 11/1983 | Buchanan | |
| 4,791,655 | A * | 12/1988 | Nagata et al. | 378/57 |
| 4,953,188 | A * | 8/1990 | Siegel et al. | 378/43 |
| 5,040,199 | A * | 8/1991 | Stein | 378/56 |
| 5,202,932 | A * | 4/1993 | Cambier et al. | 382/142 |
| 5,602,890 | A | 2/1997 | Gray et al. | |
| 5,687,211 | A * | 11/1997 | Berger et al. | 378/196 |
| 5,826,633 | A | 10/1998 | Parks et al. | |
| 5,864,600 | A * | 1/1999 | Gray et al. | 378/57 |
| 6,449,334 | B1 * | 9/2002 | Mazess et al. | 378/53 |
| 6,567,496 | B1 * | 5/2003 | Sychev | 378/57 |

(Continued)

FOREIGN PATENT DOCUMENTS

DE 861 665 1/1953

(Continued)

*Primary Examiner*—Edward J Glick
*Assistant Examiner*—Thomas R Artman
(74) *Attorney, Agent, or Firm*—Ronald E. Greigg

(57) ABSTRACT

The invention relates to a sensor device for a packaging machine in which at least one conveyor of a packaging machine which displaces at least one material to be packed and to be detected, to various stations of the packaging machine. According to the invention, at least one x-ray source and one detector are provided for irradiating the material which is to be detected and which is arranged between the x-ray source and the detector.

20 Claims, 5 Drawing Sheets

U.S. PATENT DOCUMENTS 7,106,830 B2 * 9/2006 Rosner ........................ 378/146

FOREIGN PATENT DOCUMENTS

| | | | |
|---|---|---|---|
| DE | 24 30 598 | A1 | 1/1975 |
| DE | 31 35 838 | A1 | 3/1983 |
| DE | 196 02 655 | A1 | 7/1997 |
| DE | 100 01 068 | C1 | 5/2001 |
| JP | 57-131042 | | 8/1982 |
| JP | 9-127025 | | 5/1997 |
| WO | WO 2004/004626 | A2 | 1/2004 |

* cited by examiner

SENSOR DEVICE FOR A PACKAGING MACHINE

CROSS-REFERENCE TO RELATED APPLICATION

This application is a 35 USC 371 application of PCT/EP 2006/060164 filed on Feb. 22, 2006.

BACKGROUND OF THE INVENTION

1. Field of the Invention

The invention is directed to an improved sensor device of a packaging machine as generically defined by the characteristics of the independent claim.

2. Description of the Prior Art

From German Patent DE 100 01 068 C1, a device for metering and dispensing powder into hard gelatine capsules or the like is already known. Stuffing dies, on plunging into bores, compress the powder to be packaged into compacts. So that a statement about the mass of the compacts can be made, means are provided that detect the spring travel of the stuffing dyes directly preceding the ejection die.

From International Patent Disclosure WO 2004/004626 A2, a method for optoelectronic inspection of pharmaceutic articles is already known. For ascertaining the fill level of a pharmaceutical capsule, the capsule is passed through an electromagnetic field, which is generated for instance by a laser.

It is the object of the present invention to perform more-precise and more-flexible sensing of the material to be sensed.

SUMMARY AND ADVANTAGES OF THE INVENTION

The sensor device according to the invention of a packaging machine includes at least one conveyor means of a packaging machine, which moves at least one material to be packaged to various stations of the packaging machine.

According to the invention, at least one X-ray source and at least one detector are provided for transmitting radiation through the material to be sensed. By the use of an X-ray source and a detector, the measurement precision can be increased, since the X-radiation can be easily adapted to the material to be sensed by means of changing the tube voltage and/or current and/or the emission geometry, such as the diameter of the focal spot. As a result, it can be assured that the X-radiation will be only partly absorbed by the material to be sensed. Furthermore, measurement with X-ray beams is non-contacting and nondestructive. Measurement with X-ray beams is especially well suited to determining the weight of products (such as medications) that are dispensed into containers such as gelatine capsules and are of the most variable consistency, such as powder, pellets, microtablets, pastes, and liquids.

In a refinement of the invention, focusing mean (such as diaphragms or X-ray lenses, in particular fiber lenses) are provided for guiding the X-radiation. As a result, the X-radiation can easily be adapted to the size of the particular material to be sensed, such as to different diameters of the gelatine capsules to be filled. The sensor device can thus be used with various products that are to be packaged.

In a refinement according to the invention, a radiation filter is disposed between the X-ray source and the detector. As a result, the spectrum of the X-radiation arriving at the detector can be varied, and the measurement range can be optimized. This makes the measurement more precise.

In a further refinement of the invention, a perforated screen is provided, which is likewise disposed in the beam path of the X-radiation. It is thus assured that even during a reference measurement, a beam path defined by the perforated screen is generated that matches the actual measurement operation or is at least similar to it.

In a refinement of the invention, at least one reference element is provided, which is placed between the X-ray source and the detector in order to ascertain a reference measured value. With its aid, the normal measurement can be recalibrated, thus improving the quality of the measurement.

Further advantageous features of the sensor device according to the invention of a packaging are disclosed.

BRIEF DESCRIPTION OF THE DRAWINGS

One exemplary embodiment of the invention is described in further detail below, with reference to the drawings, in which.

DESCRIPTION OF THE PREFERRED EMBODIMENTS

Figure 1:
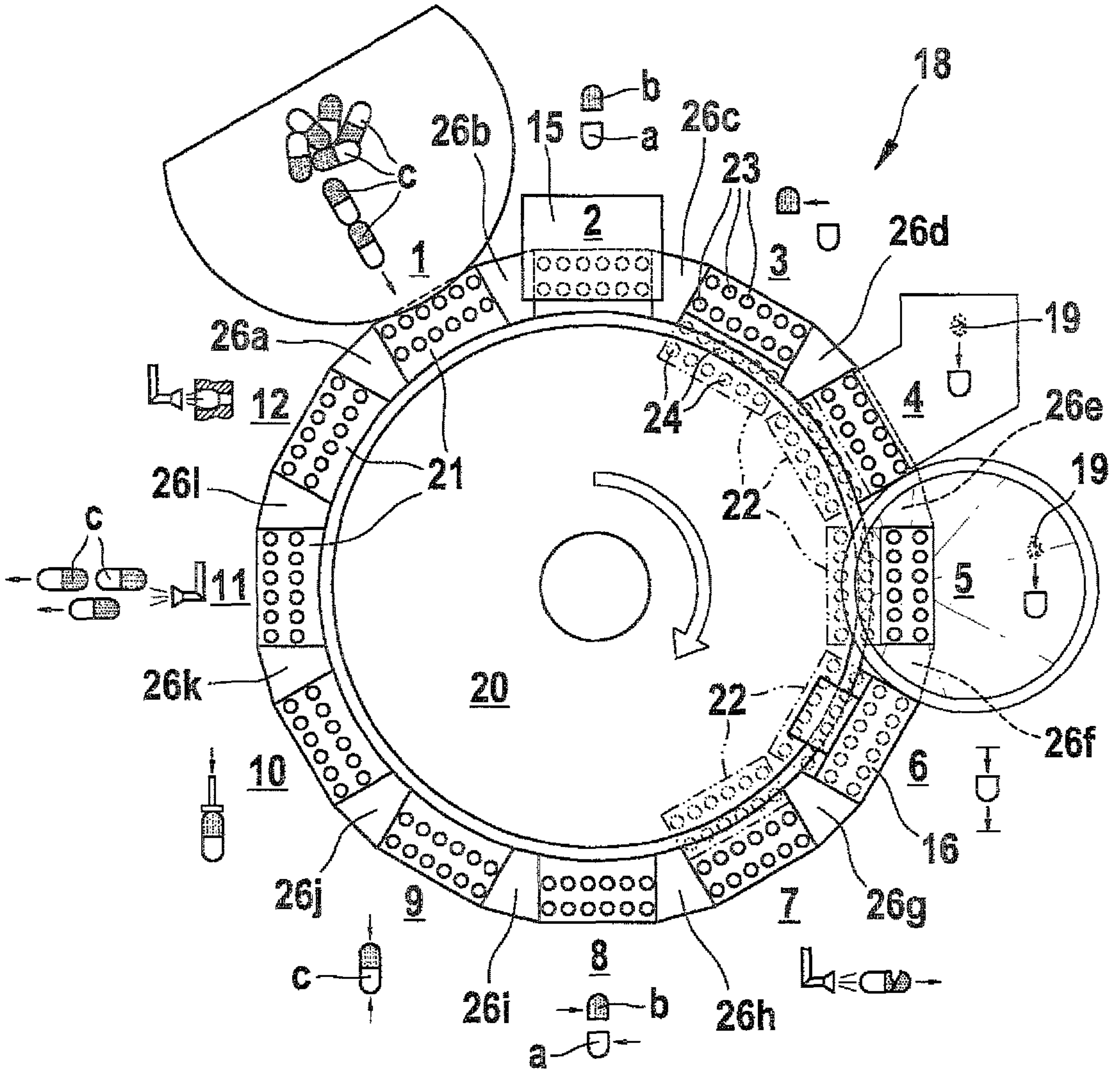
FIG. 1 is a simplified top view of a capsule filling and sealing machine embodying the invention.

A machine for filling and sealing capsules c comprising a lower capsule part a and a cap b placed over it, has a twelve-part feed wheel 20, rotated in increments about a vertical axis, at the stations 1 through 12 of which the individual handling devices are located along the orbital path. At 1, the empty capsules c to be filled are fed in random order and aligned and then delivered in order to the feed wheel 20. Next, at 2, the caps b are separated from the lower capsule parts a, and both are checked for their presence and intactness by a testing device 15. At 3, the caps b are put out of coincidence with the lower capsule parts a, so that at 4 and 5, a product can be dispensed into the lower capsule parts a. At 6, a sensor device 16 checks the filling material 19 placed in the lower capsule parts a. At 7, lower capsule parts a and caps b that are found defective are rejected. In station 8, the caps b are brought back into coincidence with the lower capsule parts a, and at 9 and 10 they are joined to the lower capsule parts a. At 11, the correctly filled and closed capsules c are expelled and carried away. Finally, the receptacles in the feed wheel 20 are cleaned at 12 before being filled again with empty capsules at 1.

Twelve segments 21, as conveyor means or container holders for lower capsule parts a, are secured at equal angular intervals to the circumference of the incrementally rotated feed wheel 20. Above the segments 21, other segments 22 for the caps b are also disposed on the feed wheel 20 in such a way that they can be raised and lowered and can also be displaced radially. The lower segments 21 have vertically oriented stepped bores 23 for the lower capsule parts a, and the upper segments 22 likewise have vertically oriented stepped bores 24 for the caps b. The stepped bores 23 and 24 are disposed, for instance in two rows of six each, coinciding with one another, in the segments 21, 22. Other configurations are conceivable, such as the single-row embodiment with five bores shown in FIG. 2. Between each two adjacent segments 21 is a respective reference element 26, or in other words a total of twelve reference elements 26*a* through 26*l*. These reference elements 26 have different thicknesses and/or different materials, which are likewise detected by the sensor device 16.

Figure 2:
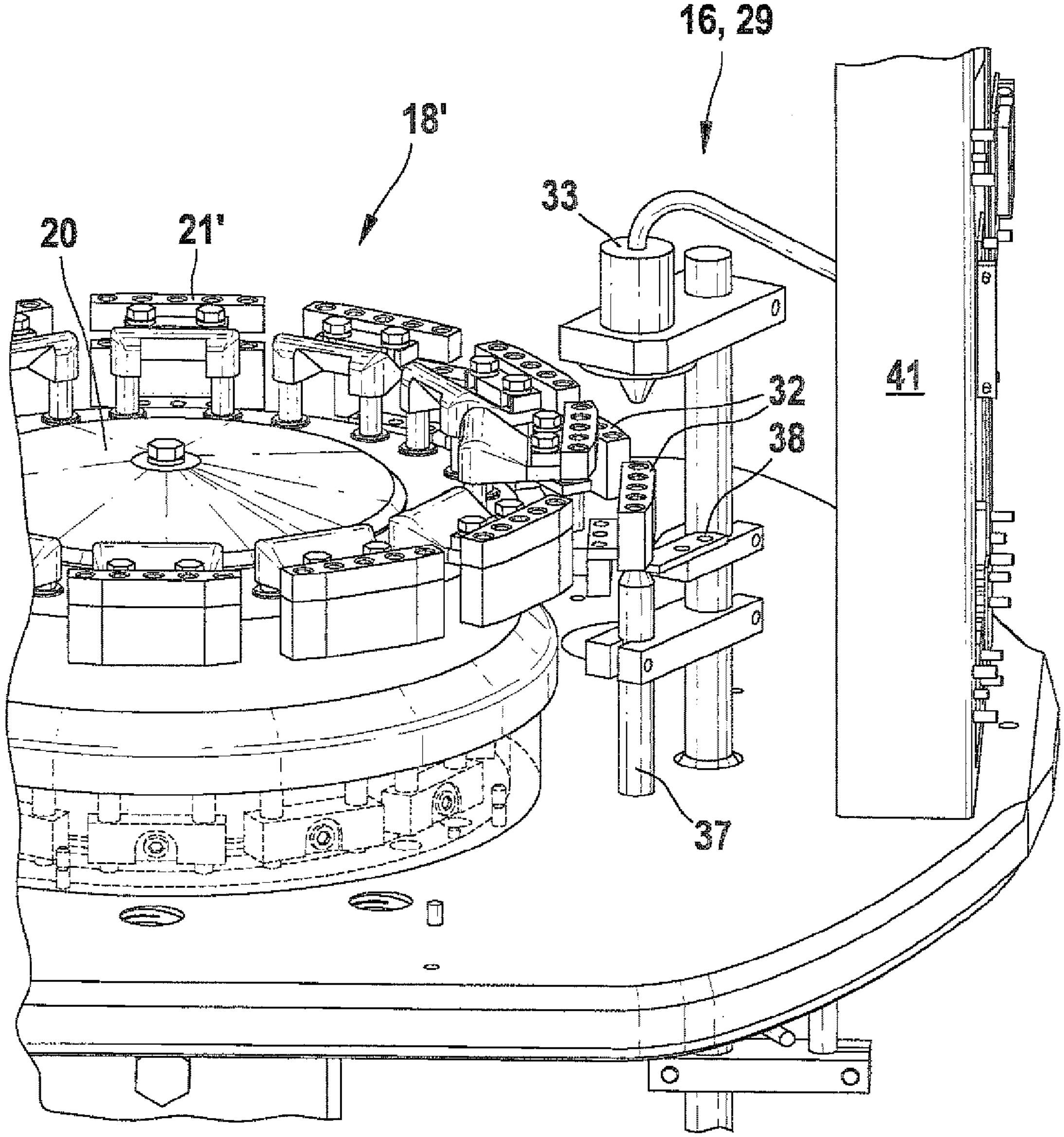
FIG. 2 is a perspective view of the sensor device of a packaging machine.

FIG. 2 shows the disposition of the sensor device 16 and of the X-ray transmitter 29 relative to the feed wheel 20 of the packaging machine. Single-row segments 21' are now secured to the feed wheel 20 as conveyor means or container holders 32. In ongoing operation, containers 31 not shown here, such as lower capsule parts a, are disposed in the container holders 32. The sensor device 16 comprises an X-ray source 33, which emits X-radiation to a detector 37 through material to be sensed that is disposed in the container holder 32 and the container 31. Moreover, at least one perforated screen 38 is mounted on a sensor holder. As a substitute or in addition, an X-ray lens 40, preferably a fiber focusing lens, can be used as a beam-guiding element between the X-ray tube 33 and the container holder 32. On the basis of a detector output signal, a measurement evaluator 41 ascertains the desired measurement variable.

Figure 3:
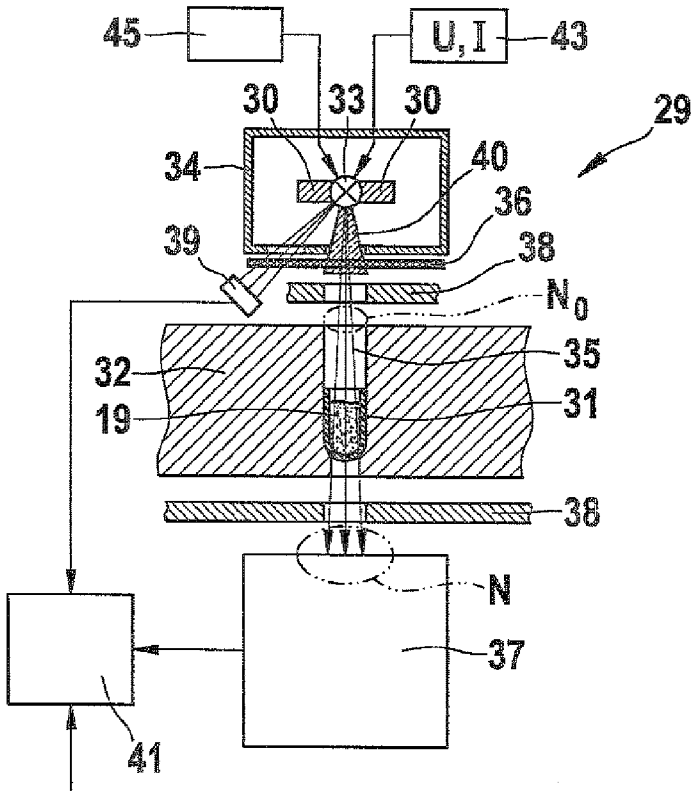
FIG. 3, a first exemplary embodiment of an X-ray transmitter.

In FIG. 3, a first exemplary embodiment of an X-ray transmitter 29 is shown. In a housing 34, there is an X-ray source 33, which as a function of a U/I or voltage/current adjusting device 43 generates radiation 35. Some of the radiation 35 generated is also delivered to a reference detector 39, whose output signal is processed by the measurement evaluator 41. A focus adjusting device 45, via focusing means 30, varies the focusing of the X-ray source 33. In the container holder 32, there is a container 31, such as a lower capsule part a. The radiation 35 penetrates the material 19 to be sensed as well as the bottom of the container 31, being attenuated in the process, and is delivered through the perforated screen 38 to the detector 37. The output signal of the detector 37 serves as an input variable for the measurement evaluator 41.

Figure 4:
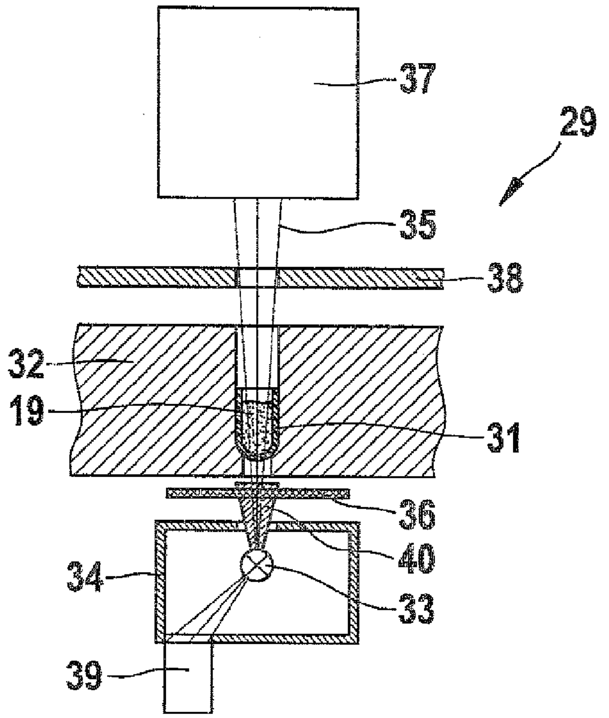
FIG. 4, a second exemplary embodiment of an X-ray transmitter.

In the exemplary embodiment shown in FIG. 4, only the disposition of the components of FIG. 3 is different; the basic functionality does not change, however. Once again, the radiation source 33 is disposed in the housing 34. The spectrum of the radiation 35 is varied by means of the radiation filter 36 and/or also by the X-ray lens 40. After passing through the radiation filter 36, the radiation 35 strikes the bottom of the container 31, in which once again the material 19 to be sensed is located. After penetrating the bottom and the material to be sensed, the radiation 35 passes through the perforated screen 38 to strike the detector 37. Once again, some of the radiation 35 generated by the X-ray source 33 is detected by the reference detector 39.

Figure 5:
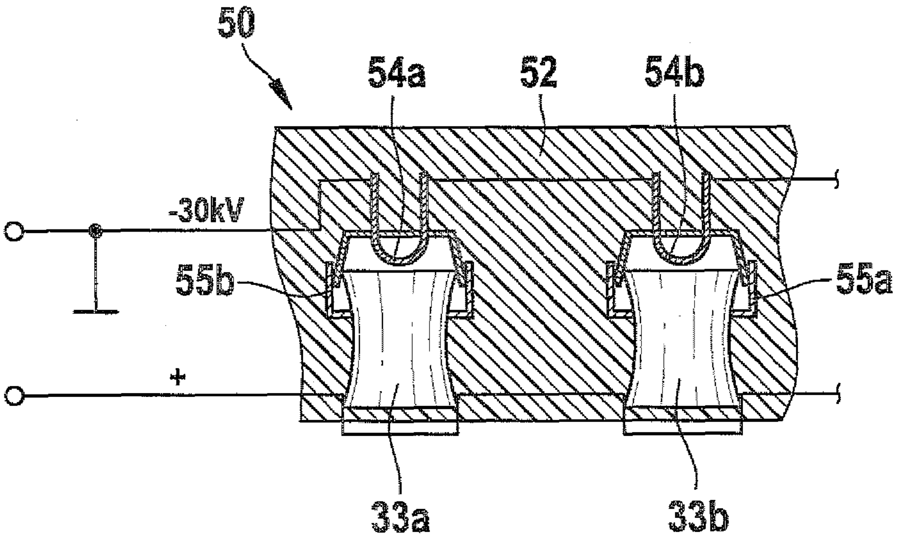
FIG. 5, a first exemplary embodiment of a matrix tube.

In FIG. 5, an exemplary embodiment of a matrix tube 50 is shown. At least two parallel-connected X-ray sources 33*a* and 33*b* are combined in a common holder and are optionally surrounded by insulating medium, such as oil, gas, or potting composition 52. This serves to insulate against the tube voltage, which is in the 30 kV range.

Figure 6:
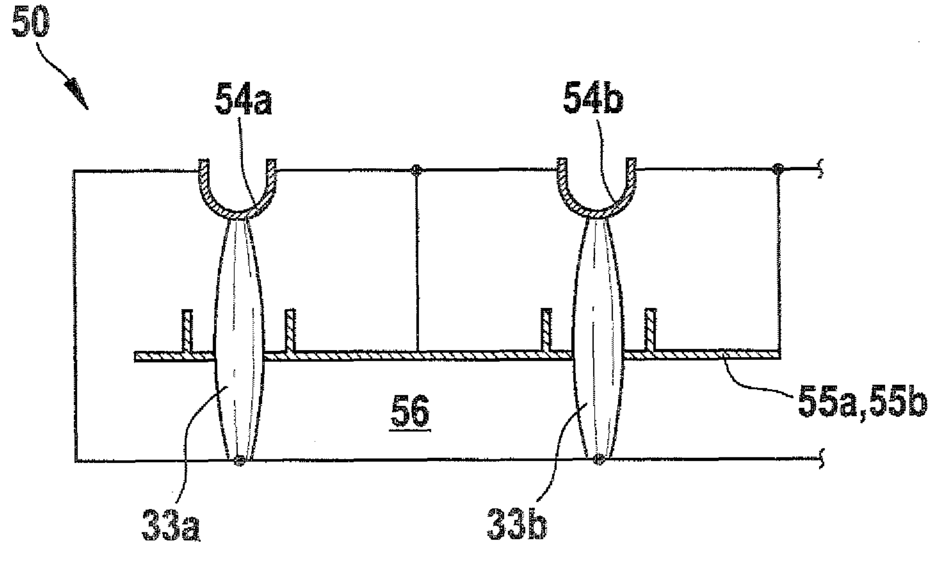
FIG. 6, a second exemplary embodiment of a matrix tube.

In FIG. 6, an alternative exemplary embodiment of a matrix tube 50 is shown. As an example, once again two radiation sources 33*a* and 33*b* are provided, with respective cathodes 54*a*, 54*b*. These cathodes 54*a*, 54*b*, like the focusing electrodes 55*a*, 55*b*, are disposed in the same vacuum 56.

The sensor device 16 shown for a packaging machine 18 serves to determine the weight of products dispensed into containers 31 such as gelatine capsules, examples of the products being medications of the most variable consistency (such as powder, pellets, microtablets, pastes, and liquids). The packaging machines 18 shown as examples in FIGS. 1 and 2 are filling and sealing machines for two-part capsules. In the lower segments 21, there are as a rule lower capsule parts a to be filled located in each stepped bore 23. At the stations 4 and 5, the filling material 19 is delivered and placed in a known manner in the corresponding lower capsule parts a. Besides powdered filling material, liquid filling material, for instance for ampules of medication, would also be conceivable. Nothing about the fundamental principle of the sensor device 16 changes. At station 6, the monitoring of the filling material 19 delivered to the previous stations 4, 5 is performed. A net weight determination is desirable; that is, with a downstream measurement evaluator 41 the sensor device 16 furnishes a standard for the filling material 19 located in the container 31, a standard that if at all possible should not be adulterated by the container 31 (or lower capsule part a) itself.

The packaging machines 18 shown in FIGS. 1 and 2 operate here in the intermittent mode; that is the segments 21, as conveyor means, are brought to the stations 1-12 in succession, remain there for a certain processing time and are then brought to the next station 1-12 by the feed wheel 20. The measurement principle is also suitable for continuous operation, that is, one that continues without a stopped time, since the measurement operation by the sensor device 16 to be described takes place within the microsecond range.

The lower capsule parts a filled with filling material 19, as material to be sensed, reach the measurement station 6. The X-ray source 33 and detector 37 are now disposed such that X-radiation 35 is sent through the associated container 31 and the filling material 19 to be sensed. The emitted radiation is absorbed only partly by the filling material 19, located in the container 31, and by the bottom of the container 31 and passes through a perforated screen 38 to reach the detector 37. The radiation N (number of arriving X-ray quanta) detected by the detector 37, in proportion to $N_0$ (number of arriving X-ray quanta if there is no filling material in the arrangement is a standard for the mass of the filling material 19, in accordance with the following equations:

$$\frac{N}{N_0} = e^{-\mu[E,Z]\cdot\rho\cdot d}$$

where ρ=filling density d=filling height

μ[E,Z]=absorption coefficient (energy- and material-specific)

The product of the filling height d and filling density ρ yields the mass per unit of surface area, $m_A=\rho\cdot d$.

The mass m of the filling material located in the container can be determined from this as a product of the mass per unit of surface area, with the cross-sectional area through which radiation is show:

$$m=m_A\cdot A$$

$$m = \left[A\cdot\ln\left(\frac{N_0}{N}\right)\right]\Big/N[E,Z]$$

However, the signal is also adulterated by a plurality of effects, such as scattered radiation and the inexact parallelism of the radiation. The mass of the containers 31 adulterates the outcome of measurement essentially because of the bottom. However, this can be eliminated by a suitable reference measurement, which is done for instance in the empty state for the particular type of capsule and which is known to the measurement evaluator 41 for the sake of appropriate compensation.

The sensor device 16 comprises at least one X-ray source 33, but typically many X-ray sources 33 disposed parallel or in a matrix, depending on the geometry of the segments 21 used as conveyor means in the packaging machine 18. As a rule, for each bore 23 in the segment 21, one separate X-ray source 33 with an associated detector 37 is provided. The propagation of the generated radiation 35 is limited by the housing 34 in such a way that radiation 35 exits only in the direction of the material to be sensed. Focusing means 30 disposed on or in the X-ray tube vary the source diameter of the radiation 35. As the focusing means 30, electrical or magnetic lenses can for instance be used, which can be varied by means of the focusing adjusting device 45. As a result, the sensor device 16 can also be easily adapted to the various geometries of the products to be packaged, which differ for instance in the capsule diameter. A possible different spacing between the X-ray source 33 and the container 31 or container holder 32 can also be adapted accordingly by this means. In the beam path between the X-ray source 33 and the container holder 32, there is a radiation filter 36, which varies the spectrum of the X-radiation with a view to an optimal measurement range. The radiation filter 36 can be selected from copper, aluminum, or other known materials, as an example. Preferably, the radiation filter 36 is easily replaceable. As a result, the sensor device 16 can be adapted to different products that are to be packaged.

As the beam-shaping element, an X-ray lens 40, for instance in the form of a fiber focusing lens, can also be built into the beam path between the X-ray source 33 and the radiation filter 36 or container holder 32. It too can vary the radiation spectrum and makes further optimization possible, particularly at low fill levels. In the case of the sensor device 16 or the X-ray transmitter 29 of FIG. 3, the radiation 35 passes through the open end of the container 31 to strike the filling material 19 that is to be sensed. This is especially advantageous when fill levels are low, since the radiation 35 even then still encompasses virtually the entire cross section of the filling material 19. In the arrangement of FIG. 4, the radiation 35 first passes through the bottom of the container 31 and then at least partly penetrates the filling material 19. Nothing about the fundamental measurement principle, however, changes. In both eases, an X-ray lens 40 is capable of optimizing the beam path.

The voltage/current adjusting device 43 varies the tube voltage and/or tube current of the X-ray source 33. The adjustability optimizes the operating point of the sensor device 16. Moreover, as a result, the sensor device 16 can easily be adapted to products to be filled that differ from one another (in terms of fill level, consistency, and cross section). For instance, the tube voltage U is raised if the expected mass of the filling material 19 increases. As a result, the penetration capability of the radiation 35 is increased. With a flexible tube current I, a variable light intensity is attained, for the sake of optimizing the measurement results.

As the detectors 37, ionization chambers, NaI detectors, scintillators with photodiodes, scintillators with photomultipliers, silicon photodiodes with and without scintillators, geiger counters, proportional counters, or CdTe detectors can be used. Advantageously, CCD or CMOS cameras with and without scintillators are possible. As a result, the absorption behavior of the filling material 19 can be replicated two-dimensionally. This is advantageous especially whenever foreign particles, such as iron chips, are detected in the filling material 19; such particles are reliably recognized by such an arrangement.

In FIG. 1, reference elements 26*a* through 26*l* of different thickness are provided between the adjacent segments 21. While the segment 21 is changing to the next processing station, the sensor device 16 detects the thickness of the respective reference element 26*a* through 26*l*. From known position data and from the known absorption behavior of the reference elements 26, the measurement evaluator 41 performs a referencing operation. For instance, the applicable thickness of the respective reference elements 26*a* through 26l replicates certain masses of filling material 19 for different products. If deviations occur between reference signals and measurement signals of the filling material 19, a suitable calibration in the measurement evaluator, or the generation of an error signal, can be done. Instead of the reference elements 26 that are located between the segments 21, it would for instance also be possible to use a filled capsule of a known weight for the referencing. In order for the referencing to supply the detector 37 with radiation 35 having the same radiation cone as in the current measurement mode, the perforated screen 38 is provided. For further referencing, a reference detector 39 may optionally be provided as well, which detects the radiation emerging laterally from the X-ray source 33 and forwards a corresponding signal to the evaluation device 41. The reference detectors 39 monitor the intensity of the X-ray source 33.

For the radiation source, tube clusters are also conceivable, which comprise many individual X-ray tubes as indicated in FIG. 4. X-ray tubes connected parallel, for instance, are embedded in potting composition 52 for insulation purposes. Instead of potting composition 52, the tubes may also be surrounded by oil or inert gas.

An alternative exemplary embodiment of a matrix tube 50 is shown in FIG. 6. Once again as an example, two X-ray tubes are shown, with the corresponding cathodes 54*a*, 54*b* and the optional focusing electrodes or coils 55*a*, 55*b*. These X-ray tubes are disposed in a common vacuum 56. As a result, matrix tubes 50 of this kind can be produced more economically, and the installation space needed can be reduced. Field barriers in the form of grids or baffles may be mounted between the tubes.

The sensor device 16 can be used not only for ascertaining the mass of the filling material 19 but also for further applications, such as detecting certain parameters of the packaging machine 18. For instance, the diameter of the bores 23 can be ascertained, which makes it possible to draw conclusions about the type of capsule to be filled. The bore diameter can be used for instance by the packaging machine controller of a suitable choice of parameters for the particular product to be filled. Thus the container holder 32 can be considered to be material to be sensed.

Figure 7:
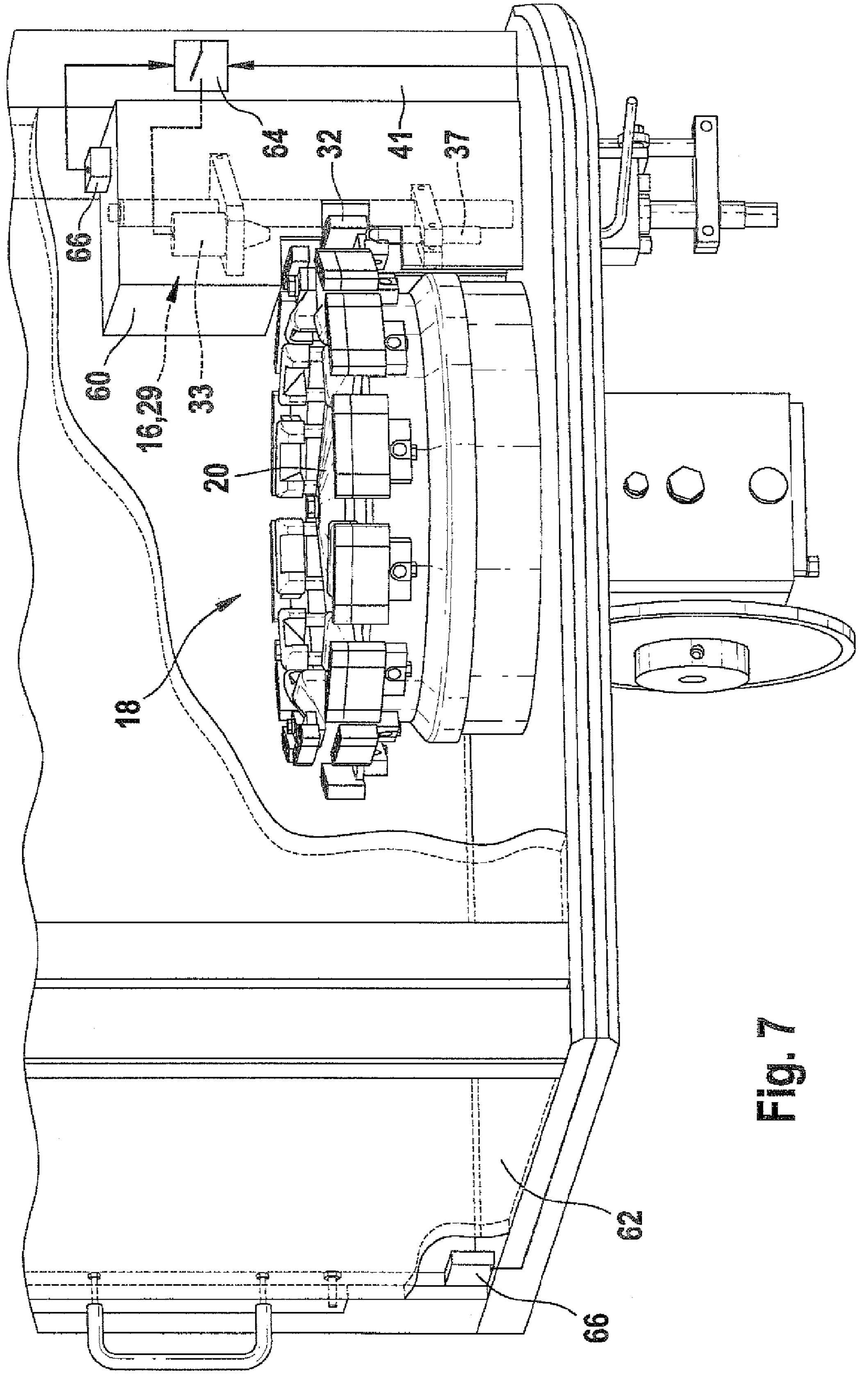
FIG. 7, a perspective view of a further exemplary embodiment.

In FIG. 7, the sensor device 16 is at least predominantly surrounded by a protective housing 60 and thus is encapsulated relative to the packaging machine 18 and can thus be rinsed off. Via a suitable sensor system 66, opening of the protective housing 60 can be detected. The output signal of the sensor system 66 is delivered to a shutoff device 64, which shuts off the sensor device 16 so that the X-ray source 33 will not put the human operator at risk. As an example in FIG. 7, a door 62 of the packaging machine 18 is shown as a further protective device. If this door 62 is opened, as detected by the sensor system 66, then once again the shutoff device 64 assures the suppression of the X-radiation.

The foregoing relates to a preferred exemplary embodiment of the invention, it being understood that other variants and embodiments thereof are possible within the spirit and scope of the invention, the latter being defined by the appended claims.

The invention claimed is:

1. A packaging machine having at least one conveyor means which moves at least one material, to be packaged and sensed, to various stations of the packaging machine including a sensing station, the sensing station including a detector and at least one X-ray source transmitting radiation through the material to be sensed and through a bottom of a container in which the material is packaged in by the packaging machine, to ascertain a mass of the material located in the container, wherein the material and the container are located between the X-ray source and the detector at the sensing station, and having at least one X-ray lens operable to vary the focusing of the radiation emitted by the X-ray source.

2. The packaging machine as defined by claim 1, further comprising at least one radiation filter disposed between the X-ray source and the detector.

3. The packaging machine as defined by claim 1, further comprising at least one perforated screen disposed between the X-ray source and the detector.

4. The packaging machine as defined by claim 1, further comprising a voltage adjusting device for varying a voltage supplied to the X-ray source.

5. The packaging machine as defined by claim 1, further comprising a measurement evaluator and at least one reference detector whose output signal is delivered to the measurement evaluator.

6. The packaging machine as defined by claim 1, further comprising a protective housing surrounding the at least the X-ray source.

7. The packaging machine as defined by claim 6, further comprising a shutoff device operable to shut off the X-radiation upon opening or removal of the protective housing.

8. The packaging machine as defined by claim 1, further comprising at least one door of the packaging machine, the door being of a material that shields against X-ray beams.

9. The packaging machine as defined by claim 8, wherein the door cooperates with a shutoff device, which shuts off the X-radiation upon opening of the door.

10. The packaging machine as defined by claim 1, wherein the at least one conveyor means conveys the material to be sensed between the X-ray source and the detector.

11. A packaging machine having at least one conveyor means which moves at least one material, to be packaged and sensed, to various stations of the packaging machine including a sensing station, the sensing station including a detector and at least one X-ray source transmitting radiation through the material to be sensed and through a bottom of a container in which the material is packaged in by the packaging machine, to ascertain a mass of the material located in the container, wherein the material and the container are located between the X-ray source and the detector at the sensing station, and having focusing means operable to vary the focusing of the electrons that are accelerated in the X-ray source, and at least one X-ray lens operable to vary the focusing of the radiation emitted by the X-ray source.

12. The packaging machine as defined by claim 11, further comprising at least one radiation filter disposed between the X-ray source and the detector.

13. The packaging machine as defined by claim 11, further comprising at least one perforated screen disposed between the X-ray source and the detector.

14. The packaging machine as defined by claim 11, further comprising a voltage adjusting device for varying a voltage supplied to the X-ray source.

15. The packaging machine as defined by claim 11, further comprising a measurement evaluator and at least one reference detector whose output signal is delivered to the measurement evaluator.

16. The packaging machine as defined by claim 11, further comprising a protective housing surrounding the at least the X-ray source.

17. The packaging machine as defined by claim 16, further comprising a shutoff device operable to shut off the X-radiation upon opening or removal of the protective housing.

18. The packaging machine as defined by claim 11, further comprising at least one door of the packaging machine, the door being of a material that shields against X-ray beams.

19. The packaging machine as defined by claim 18, wherein the door cooperates with a shutoff device, which shuts off the X-radiation upon opening of the door.

20. The packaging machine as defined by claim 11, wherein the at least one conveyor means conveys the material to be sensed between the X-ray source and the detector.

* * * * *